US009105253B2

(12) United States Patent
Hou et al.

(10) Patent No.: US 9,105,253 B2
(45) Date of Patent: Aug. 11, 2015

(54) LIQUID CRYSTAL DISPLAY DEVICE HAVING A SECOND SCAN LINE FOR TURNING ON ALL SECOND THIN FILM TRANSISTORS SIMULTANEOUSLY

(75) Inventors: Hung-Lung Hou, Shenzhen (CN); Chengming He, Shenzhen (CN)

(73) Assignee: SHENZHEN CHINA STAR OPTOELECTRONICS TECHNOLOGY CO., LTD., Shenzhen, Guangdong Province (CN)

( * ) Notice: Subject to any disclaimer, the term of this patent is extended or adjusted under 35 U.S.C. 154(b) by 313 days.

(21) Appl. No.: 13/380,852

(22) PCT Filed: Jun. 29, 2011

(86) PCT No.: PCT/CN2011/076584
§ 371 (c)(1), (2), (4) Date: Dec. 25, 2011

(87) PCT Pub. No.: WO2012/171234
PCT Pub. Date: Dec. 20, 2012

(65) Prior Publication Data

US 2012/0320022 A1 Dec. 20, 2012

(30) Foreign Application Priority Data

Jun. 17, 2011 (CN) .......................... 2011 1 0164497

(51) Int. Cl.
*G09G 5/00* (2006.01)
*G06F 3/038* (2013.01)
*G09G 3/36* (2006.01)

(52) U.S. Cl.
CPC ............ *G09G 3/3659* (2013.01); *G09G 3/3677* (2013.01); *G09G 2300/0852* (2013.01); *G09G 2310/0202* (2013.01); *G09G 2320/0233* (2013.01); *G09G 2320/0252* (2013.01)

(58) Field of Classification Search
USPC .................................................... 345/211, 92
See application file for complete search history.

(56) References Cited

U.S. PATENT DOCUMENTS

| | | | | |
|---|---|---|---|---|
| 6,181,311 | B1 * | 1/2001 | Hashimoto | 345/98 |
| 2006/0139239 | A1 * | 6/2006 | Maeda et al. | 345/50 |
| 2008/0013007 | A1 | 1/2008 | Yokoyama et al. | |
| 2008/0136983 | A1 | 6/2008 | Huang | |
| 2011/0096051 | A1 * | 4/2011 | Huangfu | 345/211 |
| 2012/0086687 | A1 * | 4/2012 | Tsubata | 345/209 |

FOREIGN PATENT DOCUMENTS

| | | | |
|---|---|---|---|
| CN | 1987979 | A | 6/2007 |
| CN | 102023434 | A | 4/2011 |

* cited by examiner

*Primary Examiner* — Long D Pham
(74) *Attorney, Agent, or Firm* — Cheng-Ju Chiang

(57) ABSTRACT

A liquid crystal display (LCD) device is disclosed. The LCD device comprises a plurality of pixel units arranged in the form of a matrix. Each of the pixel units comprises: a scan line; a data line; a first storage capacitor; a liquid crystal capacitor; and a first TFT, having a source electrically connected to the data line, a gate electrically connected to the scan line, and a drain electrically connected to the first storage capacitor. Each of the pixel units further comprises a second TFT, having a gate, a source electrically connected to the drain of the first TFT, and a drain electrically connected to the liquid crystal capacitor. The gates of the second TFTs are electrically connected with each other to control the second TFTs to be turned on simultaneously so as to tilt the liquid crystal molecules. Because this shortens the time to wait for scanning of the gates is shortened and increases the time duration in which the backlight can emit light, the number of LEDs can be reduced to lower the cost.

5 Claims, 6 Drawing Sheets

LIQUID CRYSTAL DISPLAY DEVICE HAVING A SECOND SCAN LINE FOR TURNING ON ALL SECOND THIN FILM TRANSISTORS SIMULTANEOUSLY

FIELD OF THE INVENTION

The present disclosure generally relates to the technical field of liquid crystal displaying, and more particularly, to a liquid crystal display (LCD) device and a driving method thereof.

BACKGROUND OF THE INVENTION

Nowadays, owing to such advantages as light weight, thin profile, low power consumption and low radiation, liquid crystal display (LCD) devices have found wide application in various electronic products such as computer monitors, TV sets, notebook computers, mobile phones, digital cameras and the like.

Referring to FIG. 1, there is shown a schematic circuit diagram of an LCD device in the prior art. As shown in FIG. 1, the prior art LCD device 10 comprises a liquid crystal panel 100. The liquid crystal panel 100 comprises a plurality of scan lines 111 parallel with each other and a plurality of data lines 112 parallel with each other. The scan lines 111 and the data lines 112 intersect with and are insulated from each other to define a plurality of pixel units 101.

Each of the pixel units 101 comprises a thin film transistor (TFT) 102, a storage capacitor 103 and a liquid crystal capacitor 104 all disposed at an intersection of a scan line 111 and a data line 112.

The TFT 102 has a gate electrically connected to the scan line 111, a source electrically connected to the data line 112 and a drain electrically connected to an end of the storage capacitor 103. The liquid crystal capacitor 104 and the storage capacitor 103 are electrically connected in parallel.

The LCD device 10 further comprises a backlight source (not shown) disposed beneath the liquid crystal panel 100 to provide necessary backlight for the liquid crystal panel 100. In practice, white light sources with a continuous spectrum are known as a kind of commonly used backlight source. However, in order to save energy and lower the cost, the Field-sequential-color (FSC) mechanism has been proposed in the prior art. According to the FSC mechanism, a scanning FSC backlight source employing separate RGB-LEDs is used to replace the conventional white light source with a continuous spectrum, and the RGB LEDs are used as a backlight source to emit light of different colors in place of a color filter. Because the need of a color filter is eliminated, this can lower the manufacturing cost of the LCD device, reduce the light loss rate and the power consumption, and improve the light emission efficiency.

Specifically, in order to drive the prior art LCD device 10, a scan signal is inputted at first to the scan lines 111 to sequentially scan the gate of the TFT 102 of each pixel unit 101 so that the TFT 102 is turned on and then transfer a data signal via the data line 112 to the storage capacitor 103 and the liquid crystal capacitor 104. The liquid crystal capacitor 104 supplies a voltage for tilting liquid crystal molecules. Then, after the liquid crystal molecules have tilted to a predetermined orientation, the backlight is turned on.

More specifically, because RGB LEDs are used to generate light of different colors in FSC LCD, the RGB LEDs must be turned on sequentially section by section. Each section comprises a number of scan lines 111, and gates of the TFTs 102 electrically connected with these scan lines 111 are turned on sequentially in one frame. After the gates are turned on, the liquid crystal molecules are tilted to cause optical changes.

Accordingly, in the prior art, all gates of TFTs in each section are turned on, and the backlight cannot be turned on until the liquid crystal molecules tilt to the predetermined orientation. Because this shortens the time duration in which the backlight can be turned on, the number of LEDs must be increased to achieve a desired brightness level, thus leading to a higher cost.

SUMMARY OF THE INVENTION

A primary objective of the present disclosure is to provide a liquid crystal display (LCD) device and a driving method thereof that can lower the cost by decreasing the number of LEDs.

To achieve this objective, an embodiment of the present disclosure provides an LCD device.

The LCD device comprises a plurality of pixel units arranged in the form of a matrix. Each of the pixel units comprises: a scan line; a data line; a first storage capacitor; a liquid crystal capacitor; a second storage capacitor electrically connected in parallel with the liquid crystal capacitor; and a first thin film transistor (TFT), having a source electrically connected to the data line, a gate electrically connected to the scan line, and a drain electrically connected to the first storage capacitor. Each of the pixel units further comprises a second TFT, having a gate, a source electrically connected to the drain of the first TFT, and a drain electrically connected to the liquid crystal capacitor. The gates of the second TFTs are electrically connected with each other so as to control the second TFTs to be turned on simultaneously. The first storage capacitor comprises a first common electrode and a first storage electrode. The second storage capacitor comprises a second common electrode and a pixel electrode. The liquid crystal capacitor comprises the pixel electrode and a third common electrode opposite to each other. The pixel electrode is electrically connected to the drain of the second TFT, and the first common electrode, the second common electrode and the third common electrode are electrically connected with each other.

According to a preferred embodiment of the present disclosure, the scan lines include a plurality of first scan lines and one second scan line, each of the first scan lines is electrically connected to the gates of corresponding ones of the first TFTs respectively, and the second scan line is electrically connected to the gates of the second TFTs.

According to a preferred embodiment of the present disclosure, the LCD device further comprises a data driver electrically connected to the data lines, being configured to apply a pixel voltage to the data lines so that the pixel voltage is sequentially applied to the sources of the first TFTs.

According to a preferred embodiment of the present disclosure, the LCD device further comprises:

a scan driver electrically connected to the first scan lines and the second scan line, being configured to apply a scan voltage to the first scan lines one by one so that the scan voltage is applied to the gates of the first TFTs to store the pixel voltage into the first storage capacitors, wherein the scan driver scans the first scan lines at first and then the second scan line, and then the gates of the second TFTs are turned on simultaneously to transfer the pixel voltage from the first storage electrodes of the first storage capacitors to the liquid crystal capacitors and the pixel electrodes of the second storage capacitors.

According to a preferred embodiment of the present disclosure, the LCD device further comprises a common voltage generator for supplying a common voltage to the first common electrode, the second common electrode and the third common electrode.

To achieve the aforesaid objective, an embodiment of the present disclosure provides an LCD device. The LCD device comprises a plurality of pixel units arranged in the form of a matrix. Each of the pixel units comprises: a scan line; a data line; a first storage capacitor; a liquid crystal capacitor; and a first TFT, having a source electrically connected to the data line, a gate electrically connected to the scan line, and a drain electrically connected to the first storage capacitor. Each of the pixel units further comprises a second TFT, having a gate, a source electrically connected to the drain of the first TFT, and a drain electrically connected to the liquid crystal capacitor. The gates of the second TFTs are electrically connected with each other so as to control the second TFTs to be turned on simultaneously.

According to a preferred embodiment of the present disclosure, the LCD device further comprises a data driver electrically connected to the data lines, being configured to apply a pixel voltage to the data lines so that the pixel voltage is sequentially applied to the sources of the first TFTs.

According to a preferred embodiment of the present disclosure, the LCD device further comprises: a scan driver electrically connected to the scan lines, being configured to apply a scan voltage to the first scan lines one by one so that the scan voltage is applied to the gates of the first TFTs to store the pixel voltage into the first storage capacitors.

According to a preferred embodiment of the present disclosure, each of the pixel units further comprises a second storage capacitor electrically connected in parallel with the liquid crystal capacitor.

According to a preferred embodiment of the present disclosure, the scan driver is electrically connected to the gates of the second TFTs, and after scanning the gates of the first TFTs, the scan driver turns on the gates of the second TFTs simultaneously to transfer the pixel voltage from the first storage capacitors to the liquid crystal capacitors and the second storage capacitors.

According to a preferred embodiment of the present disclosure, the first storage capacitor comprises a first common electrode and a first storage electrode, the second storage capacitor comprises a second common electrode and a pixel electrode, the liquid crystal capacitor comprises the pixel electrode and a third common electrode opposite to each other, the pixel electrode is electrically connected to the drain of the second TFT, and the first common electrode, the second common electrode and the third common electrode are electrically connected with each other.

According to a preferred embodiment of the present disclosure, the LCD device further comprises a common voltage generator for supplying a common voltage to the first common electrode, the second common electrode and the third common electrode.

To achieve the aforesaid objective, an embodiment of the present disclosure provides a driving method for an LCD device, comprising the following steps of: storing pixel voltages of individual pixel units of a liquid crystal panel into corresponding storage capacitors sequentially; and after each of the storage capacitors is fully charged, applying the pixel voltages stored in the storage capacitors to all the corresponding pixel units simultaneously to tilt liquid crystal molecules in the pixel units.

According to a preferred embodiment of the present disclosure, the driving method further comprises providing backlight to the liquid crystal panel after the liquid crystal molecules has tilted to a predetermined orientation.

According to a preferred embodiment of the present disclosure, each of the storage capacitors begins to be charged again while the backlight is being provided.

The present disclosure has the following benefits: as compared to the prior art, the LCD device and the driving method thereof of the present disclosure have a second TFT disposed in each pixel unit so that, after the pixel voltage is charged, the pixel voltage is stored into the first storage capacitor at first instead of being applied to the liquid crystal capacitor to tilt the liquid crystal molecules immediately. Meanwhile, the gates of the second TFTs are connected with each other. Then, after the gate of the last scan line is turned on and fully charged, the plurality of second TFTs are controlled to be turned on simultaneously so that the voltages across the first storage capacitors are introduced into the liquid crystal capacitors to tilt the liquid crystal molecules simultaneously, and the backlight can be turned on after the liquid crystal molecules tilt to a predetermined orientation. Because this shortens the time to wait for scanning of the gates and increases the time duration in which the backlight source emits light, the number of LEDs can be decreased to lower the cost. Meanwhile, because the backlight is provided across the whole surface but not section by section, the problems of nonuniform brightness and poor backlight coupling are overcome and the imaging quality is also improved.

BRIEF DESCRIPTION OF THE DRAWINGS

The components in the drawings are not necessarily drawn to scale, the emphasis instead being placed upon clearly illustrating the principles of at least one embodiment of the present disclosure. In the drawings, like reference numerals designate corresponding parts throughout various views, and all the views are schematic.

DETAILED DESCRIPTION OF THE INVENTION

Figure 1:
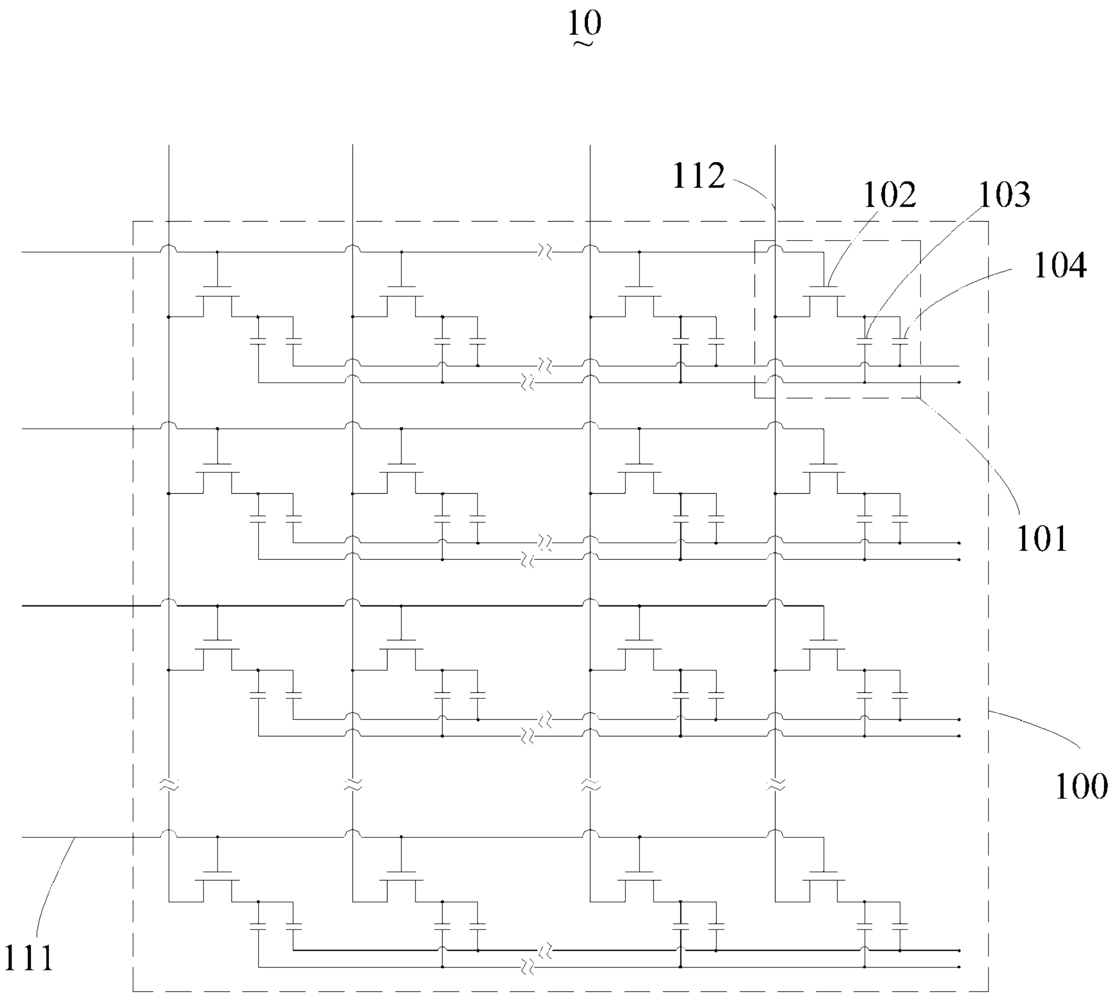
FIG. 1 (Prior Art)
FIG. 1 is a schematic circuit diagram of an LCD device in the prior art.

The present disclosure is more particularly described in the following examples that are intended as illustrative only since numerous modifications and variations therein will be apparent to those skilled in the prior art. Various embodiments of the disclosure are now described in detail. Referring to the drawings, like numbers indicate like parts throughout the views. As used in the description herein and throughout the claims that follow, the meaning of "a," "an," and "the" includes plural reference unless the context clearly dictates otherwise. Also, as used in the description herein and throughout the claims that follow, the meaning of "in" includes "in" and "on" unless the context clearly dictates otherwise.

Figure 2:
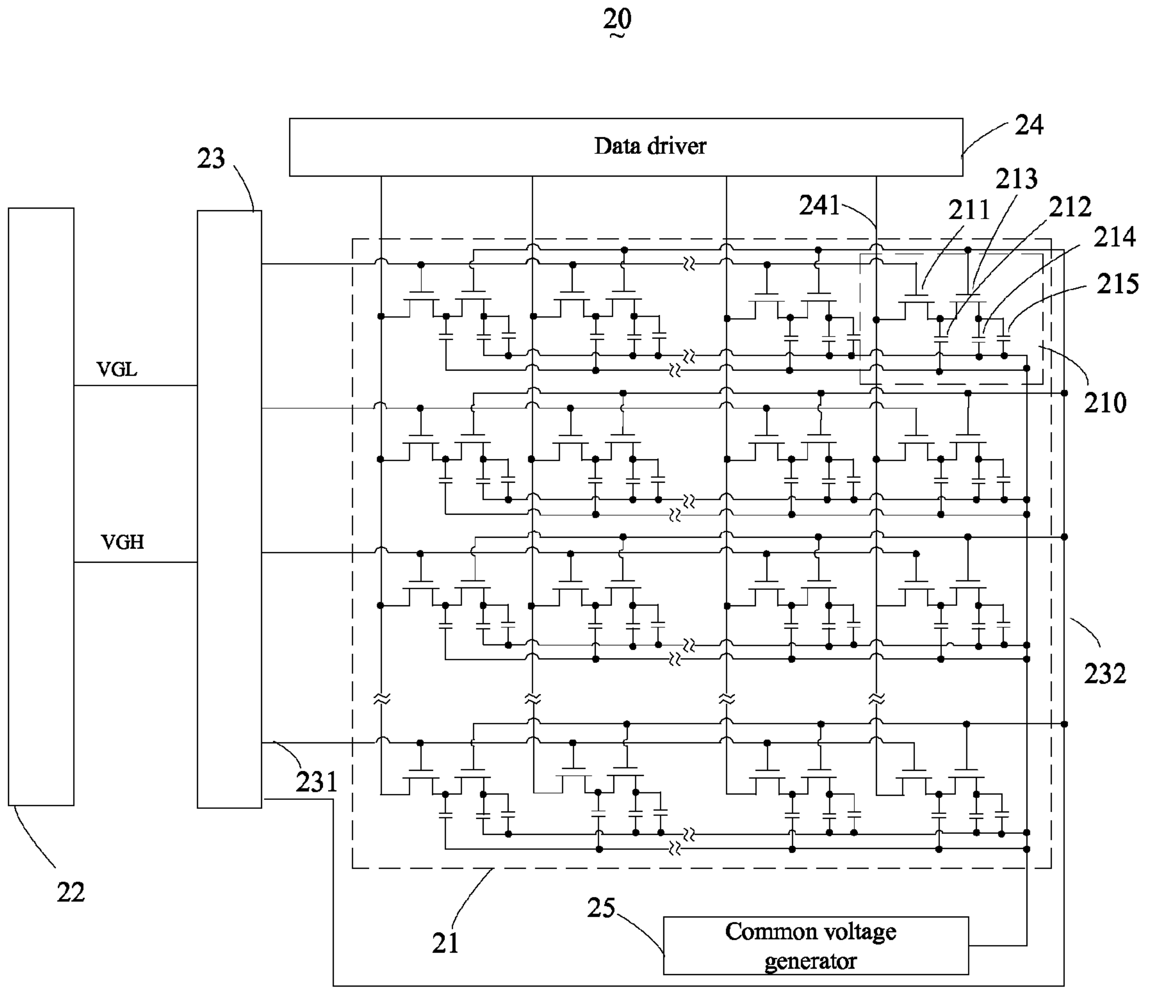
FIG. 2 is a schematic circuit diagram of a preferred embodiment of an LCD device according to the present disclosure.
Figure 3:
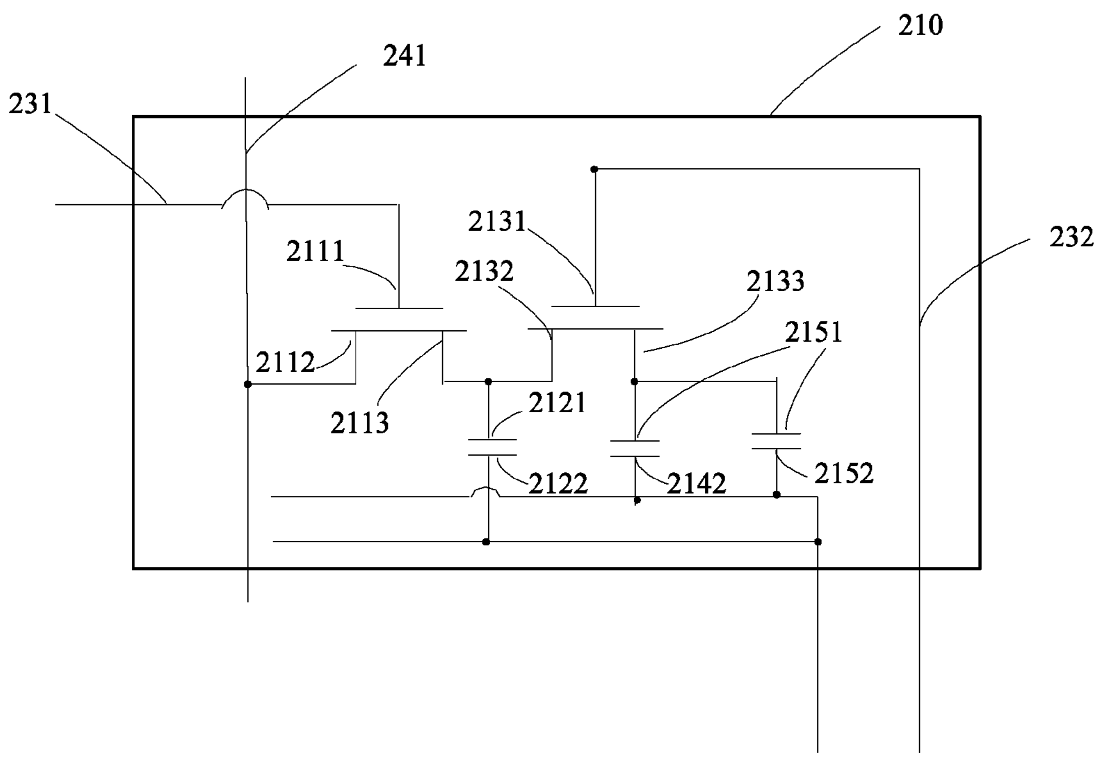
FIG. 3 is a schematic circuit diagram of each pixel unit shown in FIG. 2.

Referring to FIG. 2 and FIG. 3, FIG. 2 is a schematic circuit diagram of a preferred embodiment of an LCD device according to the present disclosure, and FIG. 3 is a schematic circuit diagram of each pixel unit shown in FIG. 2. As shown in FIG. 2, the LCD device 20 comprises a liquid crystal panel 21, a scan voltage generator 22, a scan driver 23, a data driver 24 and a common voltage generator 25.

The liquid crystal panel 21 comprises a plurality of scan lines 231 and a plurality of data lines 241. The scan lines 231 are electrically connected to the scan driver 23 respectively, and the scan driver 23 is further electrically connected to the scan voltage generator 22. The data lines 241 are electrically connected to the data driver 24 respectively. The scan lines 231 and the data lines 241 intersect with and are insulated from each other to define a plurality of pixel units 210 arranged in the form of a matrix. In this embodiment, each of the pixel units 210 comprises a scan line 231, a data line 241, a first thin film transistor (TFT) 211, a first storage capacitor 212, a second TFT 213, a liquid crystal capacitor 214 and a second storage capacitor 215.

Referring to FIG. 3, there is shown a schematic structural view of each pixel unit 210 shown in FIG. 2. The first storage capacitor 212 comprises a first storage electrode 2121 and a first common electrode 2122. The second storage capacitor 215 comprises a pixel electrode 2151 and a second common electrode 2152. The liquid crystal capacitor 214 comprises the pixel electrode 2151 and a third common electrode 2142 opposite to each other. The first common electrode 2122, the second common electrode 2152 and the third common electrode 2142 are electrically connected to the common voltage generator 25 respectively. The first TFT 211 has a gate 2111 electrically connected to the scan line 231, a source 2112 electrically connected to the data line 241, and a drain 2113 electrically connected to the first storage electrode 2121 of the first storage capacitor 212. The drain 2113 of the first TFT 211 is further electrically connected to the source 2132 of the second TFT 213, and a drain 2133 of the second TFT 213 is electrically connected to the pixel electrode 2151 of the liquid crystal capacitor 214. Gates of the second TFTs 213 in the liquid crystal panel 21 are electrically connected to each other and to the scan driver 23 via the scan lines 232 so as to control the second TFTs 213 to be turned on simultaneously.

In the LCD device 20 disclosed in this embodiment of the present disclosure, a second TFT 213 is disposed in each pixel unit 210 so that, after the pixel voltage is charged, the pixel voltage is stored into the first storage capacitor 212 at first instead of being applied to the liquid crystal capacitor 214 to tilt the liquid crystal molecules immediately. Meanwhile, the gates 2131 of the second TFTs 213 are connected with each other. Then, after the gate 2111 on the last scan line 231 is also turned on and fully charged, the plurality of second TFTs 213 are controlled to be turned on simultaneously, so that the voltages across the first storage capacitors 212 are introduced into the liquid crystal capacitors 214 to tilt the liquid crystal molecules simultaneously. The backlight can be turned on after the liquid crystal molecules tilt to a predetermined orientation. Because this increases the time duration in which the backlight source emits light, the number of LEDs can be decreased to lower the cost. Meanwhile, because the backlight is provided across the whole surface but not section by section, the problems of nonuniform brightness and poor backlight coupling are overcome and the imaging quality is improved.

Figure 4:
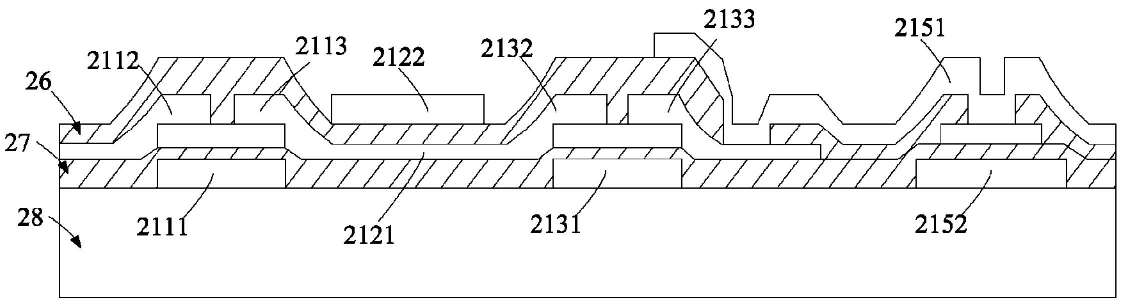
FIG. 4 is a schematic partial cross-sectional view of the pixel unit shown in FIG. 3.

Referring to FIG. 4, there is shown a schematic partial cross-sectional view of the pixel unit shown in FIG. 3. As shown in FIG. 4, the first TFT 211, the second TFT 213, the first storage capacitor 212 and the second storage capacitor 215 are all disposed on a driving substrate 28 of the liquid crystal panel 21. The source 2112 and the drain 2113 of the first TFT 211 as well as the source 2132 and the drain 2133 of the second TFT 212 are disposed in a same layer. The drain 2113 of the first TFT 211 and the source 2132 of the second TFT 213 are connected to form the first storage electrode 2121 of the first storage capacitor 212. The common electrode 2122 and the first storage electrode 2121 of the first storage capacitor 212 are separated from each other by an insulation layer 26, and the pixel electrode 2151 and the second common electrode 2152 of the second storage capacitor 215 are separated from each other by an insulation layer 27. Here, both the first common electrode 2122 and the pixel electrode 2151 are a transparent electrode layer.

In this embodiment, the scan voltage generator 22 supplies a first scan voltage VGL and a second scan voltage VGH. The first scan voltage VGL is used to turn off the first TFTs 211 and the second TFTs 213, and the second scan voltage VGH is used to turn on the first TFTs 211 and the second TFTs 213.

The scan driver 23 receives the first scan voltage VGL and the second scan voltage VGH, and sequentially outputs a plurality of scan signals to the individual scan lines 231 according to the scan voltages VGL and VGH. Furthermore, the scan driver 23 scans the gates 2111 of the first TFTs 211 sequentially via the scan lines 231. When a scan signal is outputted by the scan driver 23 to each scan line 231, the first TFTs 231 electrically connected to the scan line 231 are turned on. The scan driver 23 is further provided with a scan line 232 electrically connected to the gates 2131 of the second TFTs 213. After having scanned the gates 2111 of the first TFTs 211, the scan driver 23 supplies a scan signal to the gates 2131 of the second TFTs 213 simultaneously via the scan line 232 so that the plurality of second TFTs 231 are turned on simultaneously.

The data driver 24 is electrically connected to the sources 2112 of the first TFTs 211 via a plurality of data lines 241, and supplies a plurality of pixel voltages to the plurality of data lines 241 so that the pixel voltages are applied to the pixel electrodes 2151 via the sources 2112 and the drains 2113 of the turned on first TFTs 211 and the sources 2132 and the drains 2133 of the turned on second TFTs 213.

The common voltage generator 25 is electrically connected to the first common electrode 2122, the second common electrode 2152 and the third common electrode 2142 to supply a common voltage to the first common electrode 2122, the second common electrode 2152 and the third common electrode 2142 respectively. After the pixel voltages are applied to the pixel electrodes 2151 via the sources 2112 and the drains 2113 of the turned on first TFTs 211 and the sources 2132 and the drains 2133 of the turned on second TFTs 213, tilting of the liquid crystal molecules (not shown) occurs due to a voltage difference between the common voltage and the pixel voltage across the liquid crystal capacitor 214.

The present disclosure extends the time duration in which the backlight is turned on by reducing the time to wait for scanning of the gates. In the prior art, once a gate is turned on, the voltage is applied to the corresponding pixel unit and the liquid crystal molecules begin to tilt. However, in the present disclosure, after being charged, the pixel voltage is applied to the storage capacitor at first instead of being applied to the pixel unit to tilt the liquid crystal molecules immediately. After the last gate in the liquid crystal panel is also turned on to be charged, the second scan line 232 will be turned on in the whole panel to introduce the voltage across the storage capacitor into the individual pixel units. Then, the liquid crystal molecules begin to tilt, and the backlight can be turned on after the liquid crystal molecules tilt to a predetermined orientation.

Figure 5:
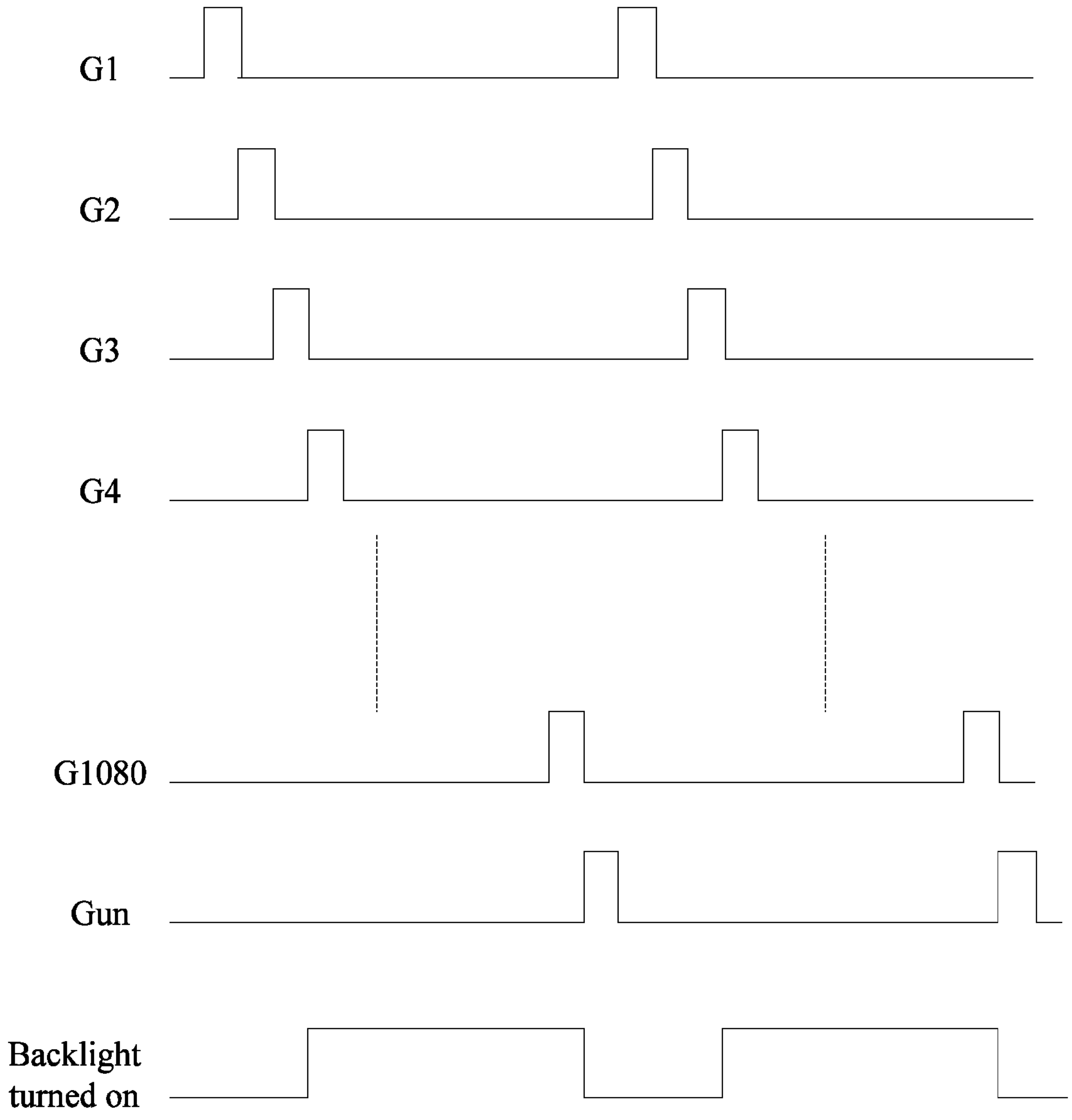
FIG. 5 is a timing diagram of operations of the LCD device according to the present disclosure.

Referring to FIG. 5, there is shown a timing diagram of operations of the LCD device 20 according to the present disclosure. Here, the LCD device 20 is illustrated to comprise 1080 scan lines as an example. Specifically, during operation of the LCD device 20 of the present disclosure, a scan signal is supplied by the scan driver 23 to each of the scan lines 231 sequentially starting from the first one to the last one (G1.G2.G3.G4 . . . G1080). Then, a plurality of first TFTs 231 electrically connected to this scan line 231 are turned on to supply the pixel voltages to the first storage electrodes 2121 of the first storage capacitors 212. After having scanned the $1080^{th}$ scan line G1080, as shown by Gun, the gates 2131 of all the second TFTs 213 are turned on simultaneously. That is, through scanning via the scan line 232, the scan driver 23 supplies a scan signal to the gates 2131 of the plurality of second TFTs 213 so that the plurality of second TFTs 213 are turned on simultaneously to transfer the pixel voltages from the first storage electrodes 2121 of the first storage capacitors 212 to the liquid crystal capacitor 214 and the pixel electrodes 2151 of the second storage capacitors 215. Next, the common voltage generator 25 generates a common voltage and supplies the common voltage to the first common electrode 2122, the second common electrode 2152 and the third common electrode 2142 respectively. As a result, tilting of the liquid crystal molecules between the electrodes of each liquid crystal capacitor occurs due to a voltage difference between the common voltage and the pixel voltage across the liquid crystal capacitor 214. After the liquid crystal molecules tilt to a predetermined orientation, backlight is provided to the liquid crystal panel 21 and, meanwhile, the gates 2111 of the plurality of TFTs 211 are scanned by the scan driver 23 again to supply pixel voltages to the first storage capacitors 212 for charging purpose.

As compared to the prior art LCD device 10 shown in FIG. 1, the LCD device 20 of the present disclosure has the liquid crystal molecules tilted simultaneously by employing the scan driver 23 to turn on the plurality of second TFTs 213 simultaneously.

Hereinbelow, a case where the backlight is divided into eight sections each having 135 scan lines and the scanning frequency is 180 Hz will be taken as an example. For the prior art LCD device 10, the scan lines are turned on in sequence from the $1^{st}$ scan line 111 to the $135^{th}$ scan line 111, and the gates corresponding to the scan lines are sequentially charged to cause tilting of the liquid crystal molecules in the pixel units 101 in sequence. In this case, the backlight cannot be turned on until the $135^{th}$ scan line 111 is scanned and the liquid crystal molecules tilt to a predetermined orientation. Therefore, the time duration in which the backlight of the prior art LCD device 10 is turned on is equal to (an entire subframe—the time of scanning the $1^{st}$ to the $135^{th}$ scan lines—the response time of liquid crystal molecules). Here, each subframe has a duration of $1/180$ s (i.e., 5.56 ms), the charging duration of each gate is 5 μs (i.e., 0.005 ms), and the total scanning time for the 135 scan lines are 0.005*135=0.675 ms. Assuming that the liquid crystal molecules have a response time of 4.5 ms, then the time duration in which the backlight of the prior art LCD device 10 is turned on is equal to 5.56−0.675−4.5=0.385 ms. In contrast, according to the present disclosure, the backlight can be turned on after the liquid crystal molecules tilt to the predetermined orientation in 4.5 ms without having to wait for scanning of the $1^{st}$ to the $1080^{th}$ scan lines. Therefore, the time duration in which the backlight can be turned on is equal to (an entire subframe—the response time of liquid crystal molecules), i.e. 5.56−4.5=1.16 ms. The value of 1.16 ms represents a considerable increase over the value of 0.385 ms in the prior art. As a result, the number of LEDs required to achieve a same brightness level is decreased, which lowers the cost; meanwhile, because it is unnecessary to provide backlight section by section, the problems of nonuniform brightness and poor backlight coupling are overcome and the imaging quality is improved.

It is worth noting that, the scan driver 23 is used to control the gates 2131 of the plurality of second TFTs 213 to be turned on simultaneously in this embodiment; however, in other embodiments, the gates 2131 of the second TFTs 213 may also be controlled to be turned on simultaneously in other ways.

Figure 6:
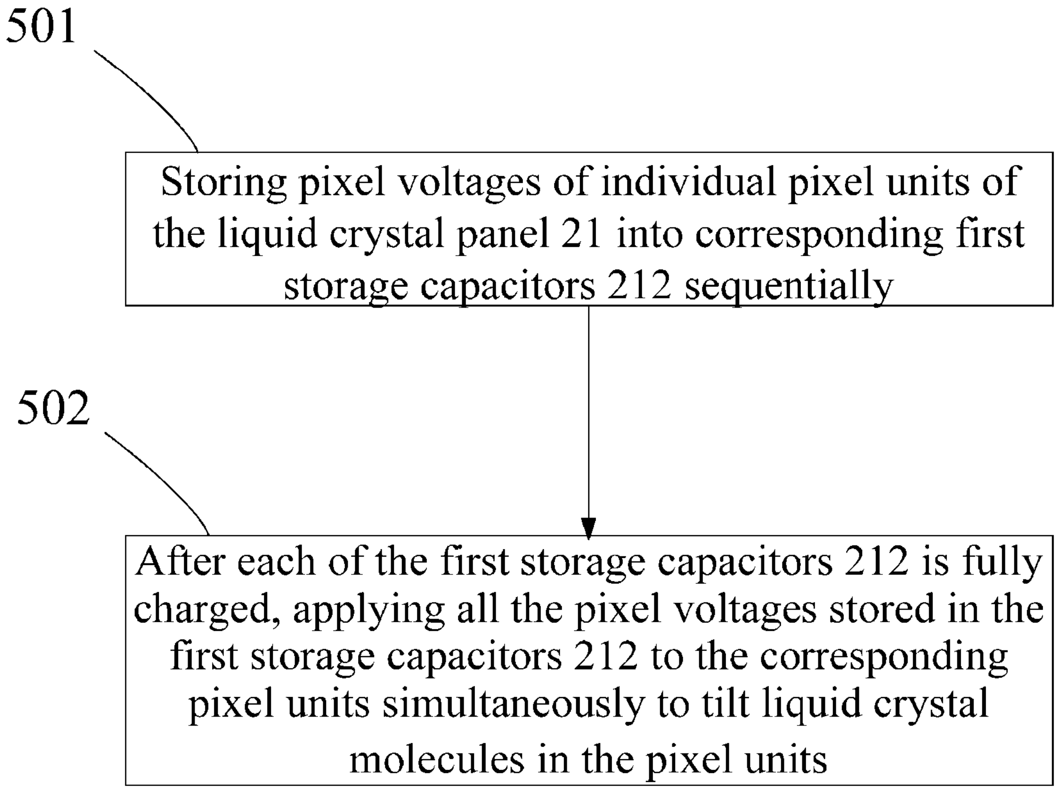
FIG. 6 is a flowchart of a preferred embodiment of a driving method for the LCD device according to the present disclosure.

Referring to FIG. 6, there is shown a flowchart of a preferred embodiment of a driving method for the LCD device according to the present disclosure. Referring to FIG. 6, the driving method for the LCD device 20 according to the present disclosure comprises the following steps:

step 501: storing pixel voltages of individual pixel units of the liquid crystal panel 21 into corresponding first storage capacitors 212 sequentially; and step 502: after each of the first storage capacitors 212 is fully charged, applying all the pixel voltages stored in the first storage capacitors 212 to the corresponding pixel units simultaneously to tilt liquid crystal molecules in the pixel units.

The step 502 of applying all the pixel voltages stored in the first storage capacitors 212 to the corresponding pixel units simultaneously to tilt liquid crystal molecules in the pixel units further comprises: providing backlight to the liquid crystal panel 21 after the liquid crystal has tilted to a predetermined orientation and, meanwhile, beginning to charge the first storage capacitors again.

As can be known from the above descriptions, the LCD device and the driving method thereof of the present disclosure have a second TFT disposed in each pixel unit so that, after the pixel voltage is charged, the pixel voltage is stored into the first storage capacitor at first instead of being applied to the liquid crystal capacitor to tilt the liquid crystal molecules immediately. Meanwhile, the gates of the plurality of second TFTs are connected with each other. Then, after the gate on the last scan line is turned on and fully charged, the plurality of second TFTs are controlled to be turned on simultaneously so that the voltages across the first storage capacitors are introduced into the liquid crystal capacitors to tilt the liquid crystal molecules simultaneously, and the backlight can be turned on after the liquid crystal molecules tilt to a predetermined orientation. Because this shortens the time to wait for scanning of the gates and increases the time duration in which the backlight source emits light, the number of LEDs can be decreased to lower the cost. Meanwhile, because the backlight is provided across the whole surface but not section by section, the problems of nonuniform brightness and poor backlight coupling are overcome and the imaging quality is improved.

It will be apparent to those skilled in the art that various modifications and variations can be made to the structure of the present disclosure without departing from the scope or spirit of the disclosure. In view of the foregoing, it is intended that the present disclosure cover modifications and variations of this disclosure provided they fall within the scope of the following claims and their equivalents.

What is claimed is:

1. A liquid crystal display (LCD) device comprising a plurality of pixel units arranged in the form of a matrix, each of the pixel units comprising:

a scan line;

a data line;

a first storage capacitor;

a liquid crystal capacitor;

a second storage capacitor electrically connected in parallel with the liquid crystal capacitor; and a first thin film transistor (TFT), having a source electrically connected to the data line, a gate electrically connected to the scan line, and a drain electrically connected to the first storage capacitor, wherein:

each of the pixel units further comprises:

a second TFT, having a gate, a source electrically connected to the drain of the first TFT, and a drain electrically connected to the liquid crystal capacitor, wherein the gates of the second TFTs are electrically connected with each other so as to control the second TFTs to be turned on simultaneously; and the first TFT, the second TFT, the first storage capacitor and the second storage capacitor are all disposed directly on a driving substrate of the LCD device, the first storage capacitor comprises a first common electrode and a first storage electrode, the second storage capacitor comprises a second common electrode and a pixel electrode, the liquid crystal capacitor comprises the pixel electrode and a third common electrode opposite to each other, the pixel electrode is electrically connected to the drain of the second TFT, and the first common electrode, the second common electrode and the third common electrode are electrically connected with each other; wherein the drain of the first TFT and the source of the second TFT are connected to form the first storage electrode of the first storage capacitor, the first common electrode and the first storage electrode of the first storage capacitor are separated from each other by an insulating layer, the first common electrode is above the first storage electrode such that the first common electrode is farer away from the driving substrate than the first storage electrode, and the first common electrode and the second common electrode are disposed directly on the driving substrate.

2. The LCD device of claim 1, wherein the scan lines include a plurality of first scan lines and one second scan line, each of the first scan lines is electrically connected to the gates of corresponding ones of the first TFTs respectively, and the second scan line is electrically connected to the gates of the second TFTs.

3. The LCD device of claim 2, further comprising:

a data driver electrically connected to the data lines, being configured to apply a pixel voltage to the data lines so that the pixel voltage is sequentially applied to the sources of the first TFTs.

4. The LCD device of claim 3, further comprising:

a scan driver electrically connected to the first scan lines and the second scan line, being configured to apply a scan voltage to the first scan lines one by one so that the scan voltage is applied to the gates of the first TFTs to store the pixel voltage into the first storage capacitors;

wherein the scan driver scans the first scan lines at first and then the second scan line, and then the gates of the second TFTs are turned on simultaneously to transfer the pixel voltage from the first storage electrodes of the first storage capacitors to the liquid crystal capacitors and the pixel electrodes of the second storage capacitors.

5. The LCD device of claim 1, further comprising a common voltage generator for supplying a common voltage to the first common electrode, the second common electrode and the third common electrode.

* * * * *